United States Patent

[11] 3,623,098

| [72] | Inventors | John Mc A. Jones<br>Tempe;<br>Richard W. Kelly, Scottsdale; Lawrence E.<br>Langley, Scottsdale, all of Ariz. |
|---|---|---|
| [21] | Appl. No. | 795,603 |
| [22] | Filed | Jan. 31, 1969 |
| [45] | Patented | Nov. 23, 1971 |
| [73] | Assignee | Motorola, Inc.<br>Franklin Park, Ill. |

[54] SIGNAL PROCESSING
12 Claims, 9 Drawing Figs.

[52] U.S. Cl. ............................................ 343/17.1 R, 325/324
[51] Int. Cl. ................................................ G01s 7/34
[50] Field of Search .......................................... 343/5, 17, 1; 325/323, 324

[56] References Cited
UNITED STATES PATENTS

| 3,149,333 | 9/1964 | Campbell ..................... | 343/17.1 |
| 3,495,244 | 2/1970 | La Rosa ....................... | 343/17.1 |

*Primary Examiner*—T. H. Tubbesing
*Attorney*—Mueller and Aichele

ABSTRACT: An input signal is supplied through a plurality of band-pass channels which selectively apply different amplifications to signals therein. Frequency adjustments in individual channels as well as between channels is provided. A composite signal is formed from the various channel signals which enhances signal detection. The electrical characteristics of the various channels is determined by interfering spectrum in which the input signal resides.

INVENTORS
JOHN MCA. JONES
RICHARD W. KELLY
LAWRENCE E. LANGLEY

BY
*Mueller, Aichele & Rauner*
ATTORNEYS

INVENTORS
JOHN McA. JONES
RICHARD W. KELLY
LAWRENCE E. LANGLEY

BY
*Mueller, Aichele & Rauner*
ATTORNEYS

INVENTORS
JOHN McA. JONES
RICHARD W. KELLY
LAWRENCE E. LANGLEY

SIGNAL PROCESSING

BACKGROUND OF THE INVENTION

This invention relates to apparatus and methods for processing signals occuring in a noise environment and particularly to those signal-processing circuits adapted to improve the signal-to-interference (S/I) ratio for enhancing the detection of an input signal to be detected.

So-called matched filters have been used in signal-processing circuits for improving the signal-to-noise ratio. Such filters when used for processing electrical signals have an impulse response which duplicates with time reversal the input signal desired to be detected. The design of a matched filter assumes a white background noise environment. In many instances the noise environment of an incoming signal includes nonlinear clutter which is interference derived from the input signal being detected. Such clutter is often characterized by reflection of radar signals by the immediate ground environmental features such as buildings, hills and the like. The design of a matched filter does not take into account such signal-derived interference.

Another system which has been used for improving the signal-to-noise ratio of an incoming signal with respect to the spectrum is the so-called comb filter. The design of a comb filter assumes that a signal will lie between frequency bands of noise or other interfering signals. By designing the comb filter such that it has a good amplitude response in the areas in which the signal is to occur and a very high attenuation characteristic in the area in which the interfering noise is to occur, signal-to-noise improvement is obtained. However, the assumption that the interference and the signal occupy different portions of the frequency spectrum is not always well founded. Therefore, the comb filter has limitations which prevent the maximization of the signal-to-noise (S/N) or signal-to-interference (S/I) ratios.

As used herein "noise" is the so-called background noise (not signal derived). The term "clutter" is reflections from emitted signals returning to the site and interfering with receipt of a signal return from a desired radar target. A common example is ground clutter interfering with radar returns of a ground based radar set. The term "interference" means all signal interference, usually consisting of "noise" and "clutter." This invention may also be used in antijamming techniques, but is primarily intended to enhance clutter rejection.

Interference spectrums in radar operations can be primarily clutter. Because of many factors involved, choosing a transmitted signal waveform which minimizes interference caused by the signal itself (clutter) is quite difficult if not a practical impossibility. In certain situations, the extraneous received reflected portions of emitted or transmitted radar signals form a nonlinear clutter which has a very wide frequency spectrum. The interfering clutter varies with range delay. This characteristic could be used to enhance clutter rejection, or in other words, improvement of a signal-to-interference ratio. The clutter component of the interference spectrum usually arises by reflection from a spatial distribution of independent scattering centers in a random manner, i.e., varies from radar site to radar site.

SUMMARY OF THE INVENTION

It is an object of this invention to provide a signal-processing circuit which tends to maximize the signal-to-interference ratio.

It is another object of the present invention to provide a signal-processing circuit capable of improving signal-to-interference ratios in a nonlinear interference spectrum.

A feature of the present invention is the provision of a multichannel spectrum shaping and adjustment circuit which adjusts the frequency and amplitude of selected portions of the incoming signal to improve the signal-to-interference ratio of a desired input signal in accordance with characteristics of the expected interference spectrum.

Another feature is the supplying of a composite spectrum adjusted signal which has an improved signal-to-interference ratio.

Another feature is a provision of a power divider means for dividing the input power into a plurality of subpower channels of different frequency bands and adjusting the amplitude of the signals in the different frequency bands in accordance with clutter in the respective frequency bands and then recombining the adjusted signals from the various frequency bands into a composite signal for signal detection.

Another feature is the provision in a clutter rejection signal processor of an arrangement suitable for adaptive or self-optimizing control of the signal processor.

Another feature is the utilization of a time correlation circuit in conjunction with the spectrum shaping and adjustment circuit to enhance signal detection. A feature of the time correlation circuit includes a plural phase signal detection with the outputs of the various phases being summed together to from an output signal of maximum amplitude.

Another feature is the provision of frequency adjustment as a part of the spectrum adjustment by individual portions or through the entire received spectrum.

Controls are provided to adjust the power-dividing network in accordance with the amplitude of the incoming interfering spectrum and to adjust the frequency bands or other characteristics of the various channels independent one of the other in accordance with variations of the incoming interference spectrum.

Briefly, the invention provides an apparatus which receives an incoming signal, preferably on an intermediate frequency carrier (IF), having an input signal in presence of noise and clutter termed interference. A spectrum shaping and adjustment circuit receives the IF signal and adjusts the amplitude thereof across the single-sided bandwidth in accordance with the expected clutter and noise, that is, those portions of the bandwidth expecting large interfering noise amplitude will be treated with maximum attenuation or minimum gain while those frequency portions of the bandwidth having low amplitude interference and high input signal amplitude will receive maximum gain. Plural channels are formed by frequency selective filter systems which may have contiguous, overlapping or spaced-apart passbands of frequencies. If the noise or interference amplitude level is such that no signal can be extracted, then that portion of the processing bandwidth is blocked. The outputs of all the filter systems are summed together and detected to provide a composite spectrum-shaped and amplitude-adjusted video signal. That video signal is supplied to a time correlation circuit wherein a plurality of boxcar detectors detect the input signal. The boxcar detectors supply their signals to a summer which then provides a single output signal having an amplitude indicative of the input signal. It is desired that the output signal have maximum amplitude. In addition to the above circuits, a radar receiver utilizing the invention can have angle-tracking circuits, range-tracking circuits, a phase-lock loop for ensuring that the frequency of operation of the receiver is maintained at the incoming carrier frequency and other circuits commonly found in radar receivers.

A control connection is also provided to the phase-lock loop and the oscillator which supply local oscillation signals to the detectors for shifting the spectrum entirely within the bandwidth for adjusting the responsiveness of the spectrum shaping and adjustment circuit. In one embodiment of the invention, gain-controlled amplifiers fed by a power-dividing network were utilized cojointly to adjust the gain of various processing channels. Channels were defined by a plurality of output filters connected to the gain-controlled amplifiers for selecting the frequency bandwidth of the respective channel supplied signals. Alternatively, the filters may be on the input portion, may consist of IF strips or the like.

THE DRAWING

Figure 2:
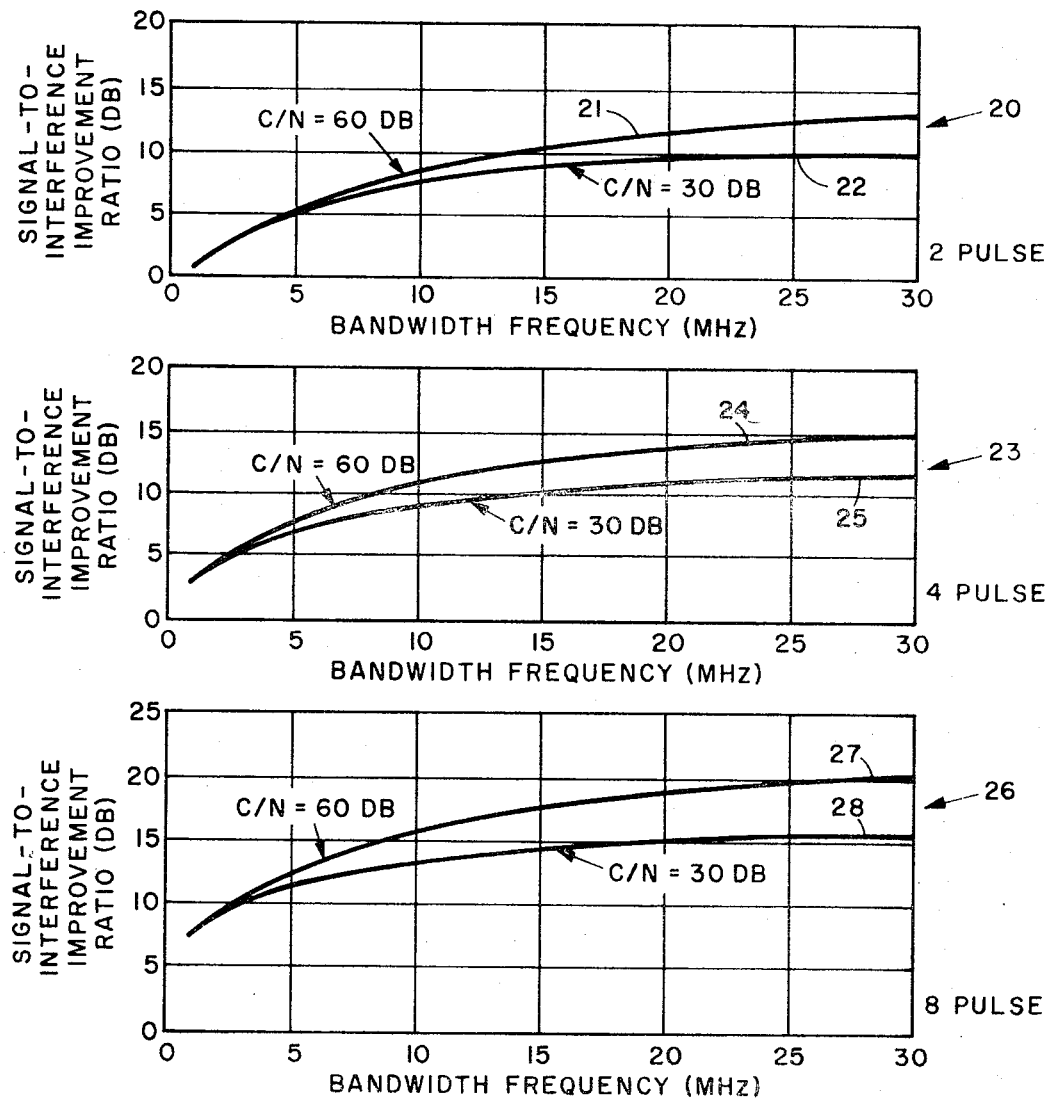
Figure 3:
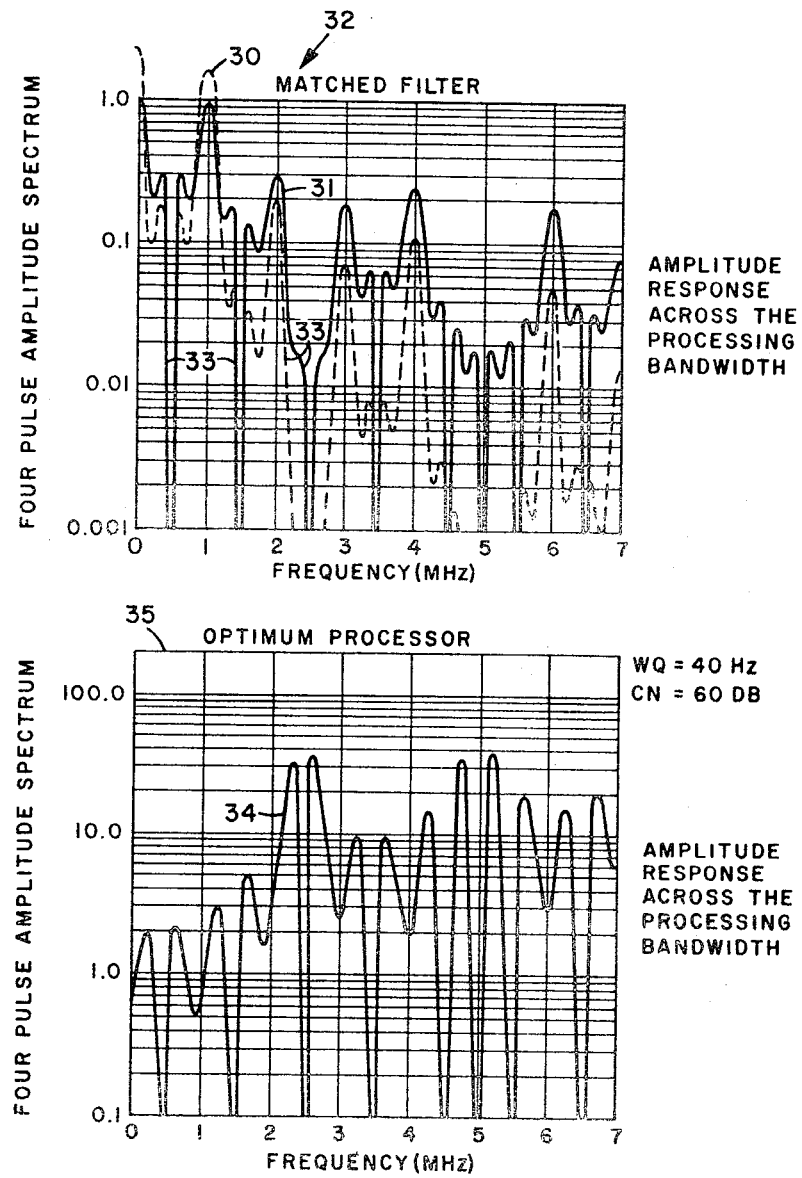

FIG. 2 is a set of charts showing the improvement ratio in decibels of one embodiment of the present invention with respect to the performance of a signal-processing circuit utilizing matched filter techniques. 4-pulse FIG. 3 is a chart showing amplitude characteristics across a seven MHz single-sided bandwidth of a four-pulse ICW sequence using a matched filter and a processor utilizing the teachings of the present invention.

Figure 1:
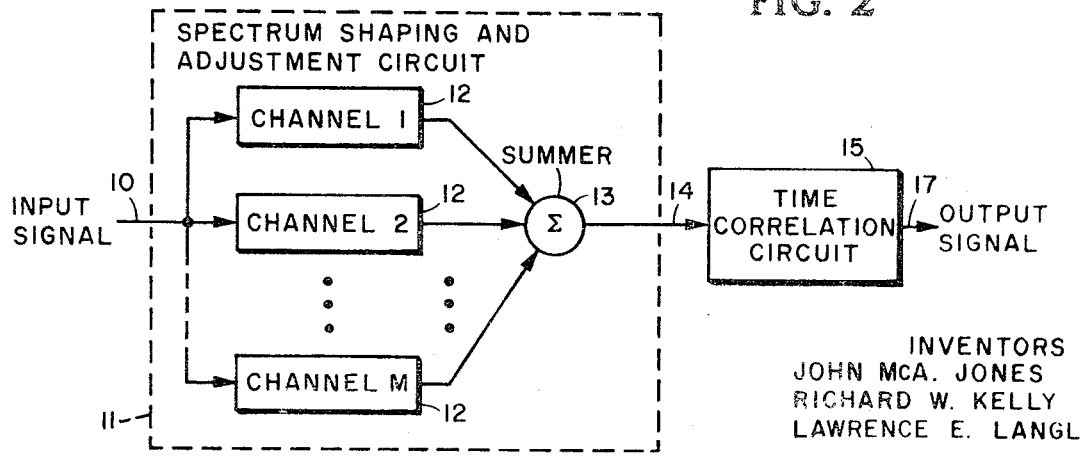
FIG. 1 is a simplified block diagram of a system utilizing the present invention.
Figure 4:
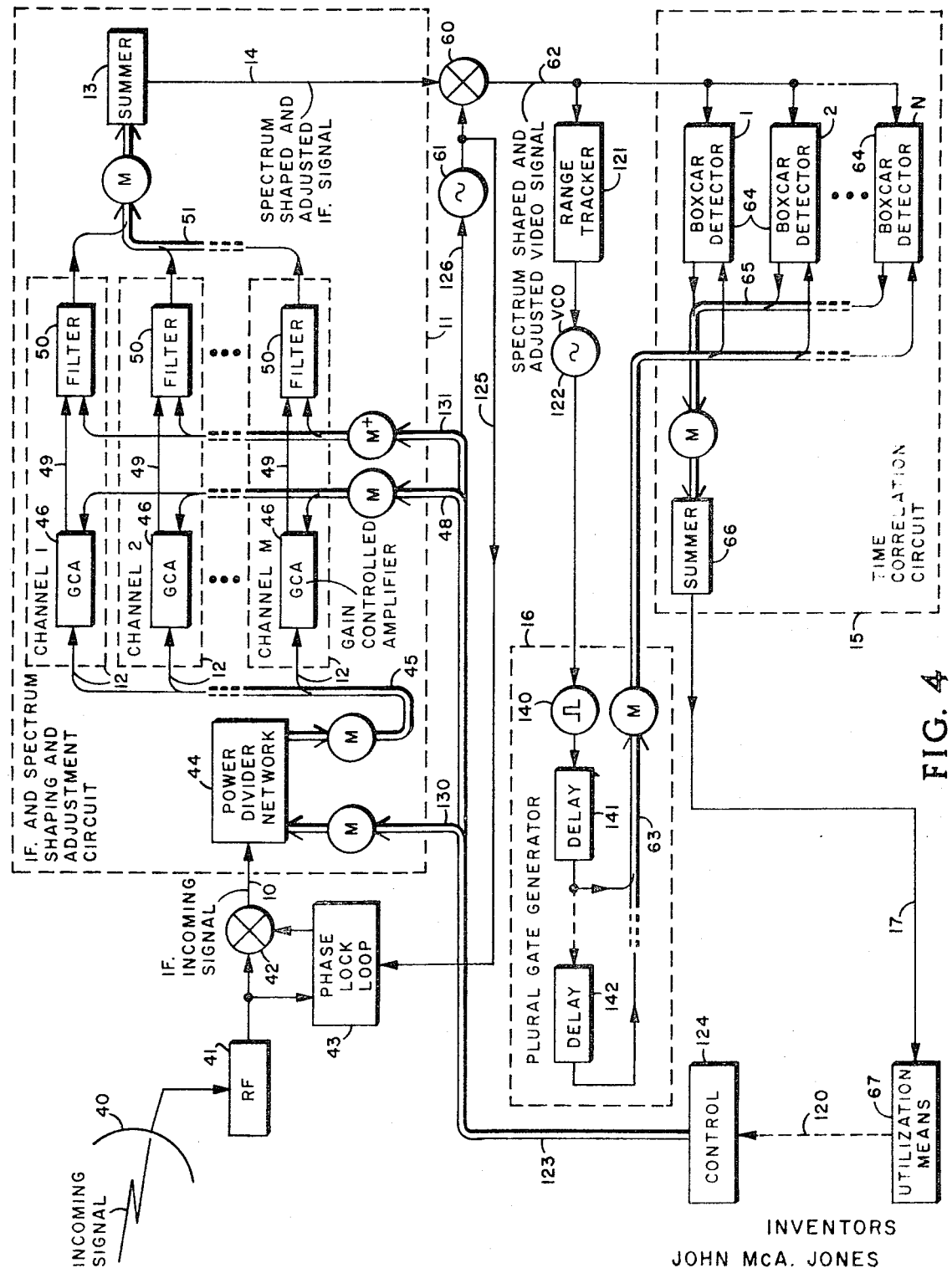

FIG. 4 is a detailed block diagram of the FIG. 1 embodiment installed in a radar receiver environment.

Figure 5:
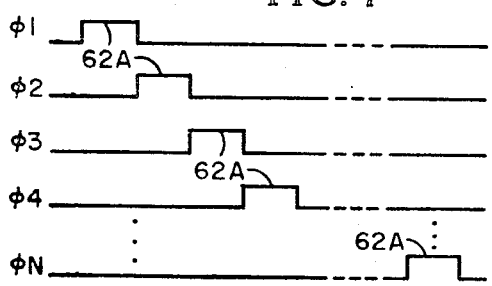

FIG. 5 is a chart of idealized waveforms used to describe the operation of the time correlation circuit illustrated in FIG. 4.

Figure 6:
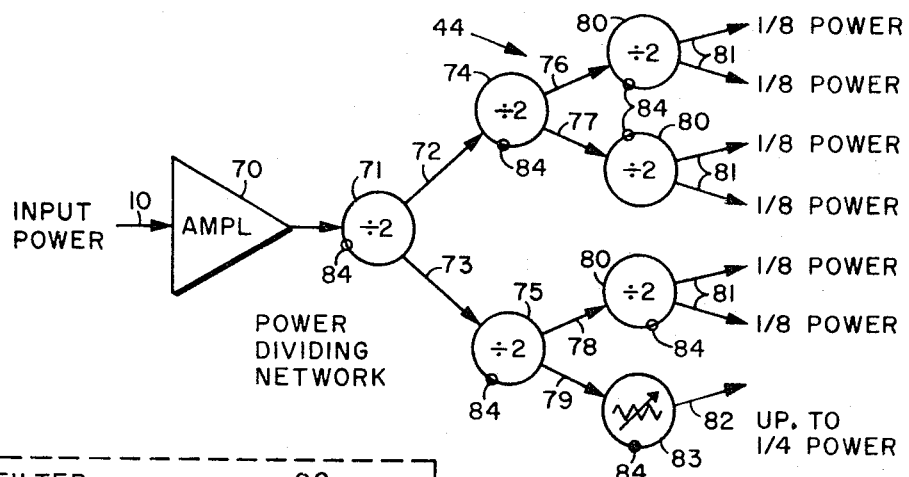

FIG. 6 is a simplified block diagram of a power divider network usable with the FIG. 4 illustrated embodiment.

Figure 7:
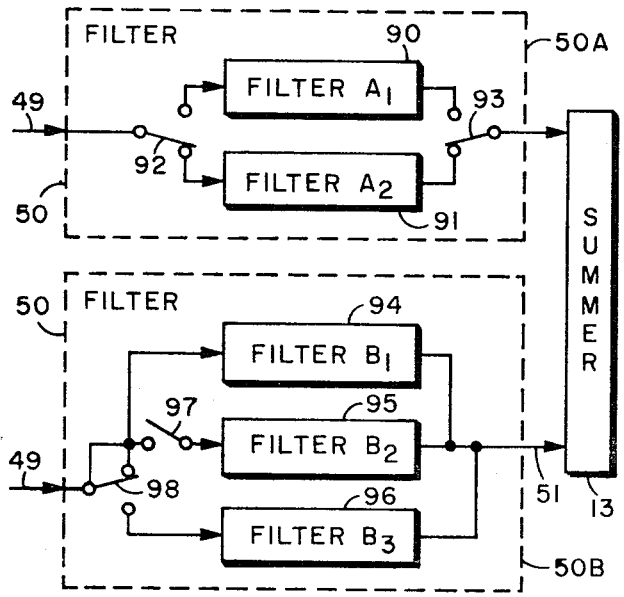

FIG. 7 is a block diagram of an adjustable filter network usable in the spectrum shaping and adjustment circuit of FIG. 4.

Figure 8:
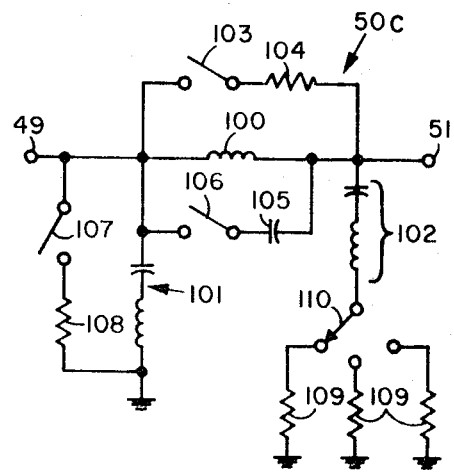

FIG. 8 is a schematic diagram of a digitally adjusted filter circuit usable with the spectrum shaping and adjustment circuit of FIG. 4.

DETAILED DESCRIPTION OF THE ILLUSTRATIVE EMBODIMENT

Referring more particularly to the drawing, like numbers indicate like parts and structural features in the various diagrams. An incoming signal having input signal components to be detected and interference signal components is supplied over input line 10 to spectrum shaping and adjustment circuit 11. As used herein the term "component" and "signal" are interchanged with respect to the input signal to be detected and the interferring signal contained in an incoming or received signal. Spectrum shaping and adjustment circuit 11 includes plural processing channels 12 shown as numbered from 1 through M indicating that any arbitrary number of processing channels may be used. Each channel shapes and adjusts the amplitude of a predetermined portion of the frequency spectrum on line 10. For example, channel 1 may receive only the lower frequency portion of the input frequency spectrum, channel 2 the next adjacent frequency portion, channel 3 (not shown) a portion of the channel 2 frequency portion plus another frequency portion, etc. The frequencies of the various portions may be adjusted within the channels as well as the amplitude and phase. The amplitude response of a processing channel may vary within the channel, i.e., the amplitude response need not be flat, i.e., the same for all frequencies within the channel. As will become apparent the shaping and amplitude adjustment within each individual processing channel is in accordance with characteristics of the interfering spectrum. Also, the spectrum may be discontinuous in that adjacent spectrum adjustment channels may have a frequency gap therebetween.

Each of the processing channels supplies its shaped and adjusted signal to analog summer circuit 13 which supplies a composite spectrum adjusted signal over line 14 to time-correlation circuit 15. Time-correlation circuit 15 includes multiphase generator 16 (FIG. 4) which phase compares reference signals with the composite adjusted signal to supply an output signal on line 17 which has a maximum amplitude to indicate detection of a radar target. A purpose of the processor is to maximize the amplitude of the line 17 signal. The line 17 signal is the detected or output signal of the illustrated embodiment and is shown in FIG. 1A.

Figure 1A:
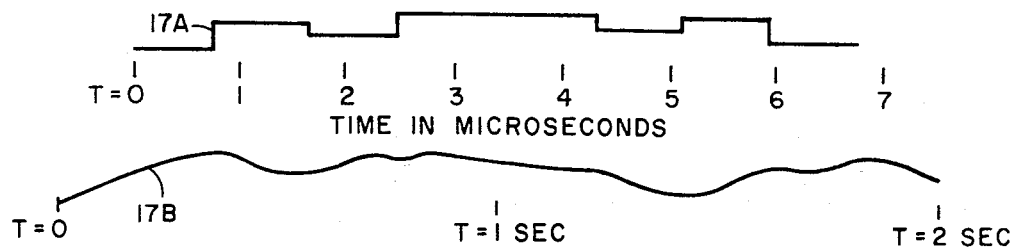
FIG. 1A is a diagram indicating the shape of received waves plotted in two different time scales.

Referring next to FIG. 1A, the waveforms on line 17 are illustrated in two time scales. Waveform 17A represents the signal on a radar return-by-return basis. That is, each time a set of incoming signals is received through antenna 40, the boxcar detectors 64 supply a new output signal amplitude through summer 66 in accordance with the amplitude of the then-returned incoming signal. It is known that radar sets operate on a periodic basis, that is, signals are emitted from an antenna (not shown) at a predetermined rate. When such emitted signals are reflected by a radar target, they reach antenna 40 on the same periodic basis but at a predetermined time after the emission of such signals. Such predetermined time is determined by the range or distance from the antenna. The amplitude of waveform 17A is shown to vary with time as the target moves with respect to the radar site. Amplitude is not indicative of range but is indicative of the detectability of the input signal within the incoming signal as well as the amplitude. Waveform 17B is on an extended time basis and shows the variation of the target returns over an extended period of time, i.e., two seconds. The sharp undulations in the waveform 17A are not apparent in waveform 17B because of the difference in time scale. The amplitude of the line 17 output signal is desired to be maximum for each periodic detection; that maximum amplitude varies with the attitude of the target with respect to the radar antenna and environmental conditions between the radar target (not shown) and the radar antenna.

FIG. 2 is a set of three charts showing the clutter-to-noise improvement ratio of the illustrated embodiment of the present invention with respect to the performance of a matched filter in the same environment. Noise is assumed to be white noise, i.e., constant amplitude over the frequency domain. Clutter is assumed to be according to a Gaussian distribution. The signal is an interrupted CW(ICW) pulse pattern. It should be noted that the improvement ratios are the ratios of the rejection factors for clutter and rejection factors for noise. A rejection factor is a measure of a signal processor's ability to reject noise or clutter and thereby better accept for detection an input signal within that noise and clutter. The frequency ordinate shows the single-sided bandwidth of the radar processor in megahertz. The pulse characteristics also vary the improvement ratios. For the illustrated charts, rectangular pulses of the ICW type having 1-megahertz pulse-repetitive frequency with a 40 percent duty cycle were utilized. The clutter-to-noise (C/N) ratios also affect the improvement in detection. For example, chart 20 shows the improvements of the illustrated embodiment over the matched filter for a two-pulse sequence, with a clutter-to-noise ratio of 30 db. the invented apparatus and method improved rejection by 10 db. over a matched filter (curve 22). At 60 db. curve 21 shows an improvement of about 13 db. with a 30 Mhz. single-sided bandwidth. At narrower processor bandwidths, the improvement provided by apparatus using this invention is somewhat reduced. Chart 23 in curves 24 and 25 show improvements in rejection ratio of apparatus and methods of this invention for a four-pulse sequence for 60 db. and 30 db. clutter-to-noise ratios. Chart 26 illustrates the improvement in the ratios for eight-pulse sequences, with curve 27 showing improvement for a 60 db. C/N ratio and curve 28 for a 30 db. C/N ratio. The improvement provided by apparatus using the invention is greater when there is a greater clutter-to-noise ratio, and the improvement increases with the bandwidth of the processor as well as with the number of pulses in a sequence. For example, there is a 10 db. improvement over an eight-pulse sequence as opposed to a two-pulse sequence.

How the improvements illustrated in FIG. 2 charts are obtained is best understood by referring to the FIG. 3 charts showing the characteristics of the matched filter and of a processor utilizing the teachings of the present invention, also referred to as an "optimum processor." A four-pulse sequence radar return was utilized. Chart 23 (FIG. 2) improvements are based upon the information contained on the charts of FIG. 3. Specifically, line 24 shows the improvement in decibels of the optimum processor over a matched filter.

The FIG. 2 charts illustrate the improvement ratios for a bandwidth up to 30 Mhz. For simplicity, the FIG. 3 charts are limited to 7 Mhz. bandwidth. It is to be understood that the principles involved are equally applicable to a 30 Mhz. bandwidth processor or greater bandwidth processors. Line 30 in FIG. 3 represents the Fourier spectrum over a 7 megahertz bandwidth of four successively occurring pulses. These pulses had a pulse repetitive frequency of 1 megahertz with a duty factor of 40 percent and are of generally rectangular shape. Line 30 represents the idealized return in the frequency domain of such four successively occurring rectangular pulses. With no noise, a matched filter would have a frequency response characteristic identical to line 30. Matched filters are designed with a concept that there is a constant noise. Accordingly, a matched filter has a response indicated by line 31. That is, line 31 represents the amplitude of the signal return in the presence of white noise. There is no consideration of clutter. Therefore, clutter will be received and detected as a signal. In FIG. 3 and chart 32 the difference between lines 30 and 31 represents the output signal of a matched filter type processor.

Before proceeding further, it should be noted that both waveforms 30 and 31 have a plurality of amplitude nulls 33 across the frequency spectrum of the single-sided processing bandwidth. These nulls in the Fourier representation are a function of the duration (duty cycle) and the pulse repetitive frequency of the pulses as well as the shape. The number of pulses in a sequence also will affect the nulls. The greater the number of pulses, the steeper nulls, i.e., the sharper. Assuming an infinite number of pulses in a given sequence, the Fourier representation in the frequency domain is a pulse-type of representation. This is a limiting case and it is to be understood will not be found in a practical embodiment.

The depth of the nulls, that is, the distance between the peaks and the valleys, is a function largely of a probability density function termed "Wg." Wq can be said to represent the property of a clutter source or of a scattering medium; that is, it is representative of the property of the environment reflecting the emitted radar signals. Assume there is an infinite scattering medium, then there would be no nulls with the incoming signal being effectively at a DC level. This is also a limiting case and will not be found in a practical embodiment. It points out that the greater the scattering, i.e., the higher the number Wq, the shallower the nulls 33. In the illustrated embodiment, Wq had a value of 40 hertz.

Since a matched filter assumed no clutter, the nulls of a matched filter generally are shallower than that of an optimum processor. For example, see line 34 of chart 35 which represents the frequency response of an optimum processor utilized to detect the signal 30 in a Gaussian clutter environment. It is to be understood that in other environments the frequency response curve 34 would have an entirely different shape in accordance with the clutter. In utilizing this invention a radar unit is disposed in the particular site; then the clutter is measured and the optimum processor is adjusted to reject the clutter at the particular site. In this manner the radar processor is adjusted to provide best or optimum clutter rejection at each site.

Line 34 in FIG. 3 representing the frequency response of the illustrated optimum processor is also an approximate plot of the amplitude spectrum in the frequency domain of the ratio of the signal power level at a given frequency divided by the interference power level at that same frequency. Interference level is the summation of the background noise level plus the clutter power level. A processor according to this invention has a very low amplitude response at those frequencies where the interference is maximum. At a given frequency the clutter may cancel and the white noise may cancel each other out; therefore, it is desired to have a very high response at that given frequency. By so tailoring the processor adjustment, it is readily seen that the maximum signal response of the processor is obtained by making the processor at a minimum responsiveness where the interference is maximum and a maximum responsiveness where the interference is minimum.

The method and apparatus of adjusting the frequency spectrum to accomplish the above-stated results are described with respect to the block diagram in FIG. 4 wherein antenna 40 intercepts the radar return signals. RF section 41 amplifies the intercepted signals. The amplified RF signals are supplied to mixer 42 which also receives the heterodyning signal from phase-lock loop 43 to then supply an IF signal over line 10 to spectrum shaping and adjustment circuit 11. Such IF signal includes the desired input signal plus interfering signals on an intermediate frequency (IF) carrier. Spectrum shaping and adjustment circuit 11 includes power divider 44 receiving the input IF signal and dividing the input IF power, as later explained, into the plurality of channels 12. As used herein, the term "channel" includes those portions of divider network 44 supplying signals to the gain-controlled amplifiers 46 as indicated by the two lead lines from each numeral 12, one going to the dashed box including gain-controlled amplifiers 46 and a second lead line to a signal path in cable 45. Cable 4 having M signal paths connects power divider 44 to the various channels 12. Divider 44 is capable of supplying any percentage of the input IF power on line 10 to any of the channels. Each processing channel 12 includes a gain-controlled amplifier 46 which receives the power-divided IF signal and amplifies same in accordance with the gain-control signal received on the respective lines 46 of cable 48 which also has M signal paths. Such gain-control signal is referred to later. Therefore, insofar as amplitude response of the optimum processor is concerned, there is provided a plurality of means for adjusting the amplitude response at a given frequency. A first means is the power divider 44; a second means is the gain-controlled amplifier 46 in the various processing channels 12. The internal construction of gain-controlled amplifiers is well understood and will not be elaborated upon in this specification.

Each of the gain-controlled amplifiers 46 supplies the amplified signals over the lines 49 to filter system 50, respectively. Each filter system 50 passes a different portion of the total processor bandwidth spectrum. Therefore, most of the filters are of the band-pass type and of known design, such as M-derived filters and the like. While each of the filters may pass a unique portion of the processor bandwidth, it is understood that some of the filters may have a frequency overlap such that both pass the same band of frequencies. That is, one channel may have a passband of frequencies 100.0 to 100.5 MHz. while a second channel may have a passband from 100.4 to 101.0 MHz. The small band 100.4–100.5 MHz. is processed by both channels. Also, there may be discontinuities in the processor bandwidth; that is, frequency adjacent filters may have a frequency spacing therebetween to provide a null in the total frequency response which has zero amplitude response. For example, one channel may have a passband of frequencies from 110 to 111.4 MHz. and another channel a passband of frequencies from 111.5 to 116 MHz. The small band of frequencies between 111.4 and 111.5 MHz. is completely blocked out (assuming no other channels pass such frequencies).

The filter systems 50 supply signals through cable 51 having M signal paths to summer 13 wherein all of the signals are arithmetically added together to provide a composite spectrum adjusted signal on line 14. Mixer 60 receives the composite signal on line 14 as well as the heterodyning signal from oscillator 61 to provide a video signal over line 62 to time correlation circuit 15.

The output of the phase generator 16 provides N-phase signals 62A (FIG. 5) over cable 63 to N-boxcar detectors 64 which comprise part of the time correlation circuit 15. In the illustrated embodiment, a four-phase signal was used for time correlation, it being understood that any number of phases may be selected in accordance with the number of pulses in the pulse sequence being received. Phase-generator 16 supplied signals actuate the boxcar detectors 64 in the known manner to detect the incoming signals on line 62. The output signals of detectors 64 are supplied over cable 65 having N signal paths to the summer 66. Summer 66 arithmetically adds the signals together in a linear manner to supply an output signal over line 17 (signal 17A of FIG. 1A). In this embodiment maximum amplitude on line 17 is desired. Utilization means 67 receives the output signal for utilizing same. Utilization means 67 may be an indicator of some type, a control device, a digital analytical processor or the like.

When the FIG. 4 illustrated embodiment is installed in a fixed location, power divider 44, the gain-controlled amplifiers 46 and filters 50 may be manually adjusted to accommodate the clutter in that particular environment. To adjust the processor after installation, the radar transmitter (not shown) is operated in the intended mode. The returns intercepted by antenna 40 will include the clutter-interfering signals for that site. The returns are displayed in an oscilloscope with the X-direction of the oscilloscope being driven by a sweep frequency generator which sweeps the processor bandwidth. The scope display is the Fourier representation of an incoming signal, such as line 31 of FIG. 3. An overlay having the Fourier representation of the emitted signal, such as line 30 of FIG. 3 is placed over the face of the oscilloscope and compared with the incoming signal Fourier representation. The processor is then adjusted such that processing channels having large signal-to-interference ratios receive greater amplification while processing channels having small signal-to-interference ratios are de-emphasized. Channel bandwidths are adjusted to take advantage of any peculiar characteristics in the Fourier representation of the incoming signal. The intermediate frequency of the processor is checked to see if any uniform translation of the processor bandwidth would improve detectability of the input signal. Of course, other means for adjusting the processor response to the clutter environment may also be provided.

Referring next to FIG. 6, power divider network 44 is shown in block diagram form. Input power is supplied over line 10 to wideband amplifier 70. A first divide-by-two power unit 71 supplies one-half the power supplied over line 72 and the other half over line 73. Divide-by-two power units 74 and 75 each receive one-half the input power which, in turn, divide the received power in one-half to supply one-fourth input power, respectively, over lines 76 through 79 to another array of divide-by-two power units 80. Each of the units 80 in turn divide received power into one-eighth input power over each of the output lines 81, each of which carries one-eighth input power except line 82 which has a variable resistor power-reducing network 83 of known design which supplies up to one-fourth input power over line 82. Control lines 84 to each of the power-reducing units 71, 74, 75, 80 and 83, are provided to selectively electrically adjust the power division between their respective output lines. For example, power-dividing unit 71 may be adjusted to supply more than one-half the input power over line 72, while supplying less than one-half the input power over line 73. Power losses internal to the power-dividing networks were not considered in the above statements, it being understood that these statements represent an ideal situation and that in a practical embodiment internal losses may be significant. Such electrically adjusted power-dividing units are well known. One example of a power-dividing network is shown and described by Allen et al. in U.S. Pat. application Ser. No. 578,392, filed Sept. 9, 1966, U.S. Pat. No. 3,492,501 granted Jan. 1, 1970 and assigned to the assignee of this invention. It is understood that other forms of power-dividing networks may be utilized, such as transformers and the like.

The filters 50 may be adjusted both as to bandwidth and as to the frequency, i.e., the band of the filter may remain the same and yet the filter center frequency may be translated either to a higher or lower frequency. Referring to FIG. 7, two filter systems 50A and 50B are illustrated in block diagram form, each receiving input signals over line 49. Filter system 50A has two filter components 90 and 91. Filter 90 has a passband which is narrow, for example, 250 kilohertz. Filter 91 may have a broader passband, for example, 1 megahertz. Switches 92, 93 are ganged together to switch in either filter 90 or 91; switches 92 and 93 may be electrically actuated, as later described. Both filters 90 and 91 may have the same center frequency or may have offset center frequencies, the relationship to be based upon the lower frequency or the higher frequency or some other arbitrarily selected reference frequency.

Referring next to filter system 50B, it has three filters, 94, 95 and 96. Filter 94 has a bandwidth B1, filter 95 a bandwidth B2, and 96 a bandwidth B3. Bandwidth B3 may be greater than the total of bandwidths B1 and B2. In this embodiment, filter 94 is continuously connected between lines 49 and 51. Switch 97 selectively connects in filter element 95 for increasing the bandwidth of filter system 50B. Switches also can be included in parallel circuit relationship to filters 94 and 95 in filter system 50B. Therefore, with this given center frequency, filter B1 may be used for passing a very narrow bandwidth, B2 may be added to pass higher frequencies immediately above bandwidth B1, while filter 96 may be switched in by operation of the switch 98 to pass frequencies just below bandwidth B1. It is also understood that bandwidth B3 may be made to coincide with the total of bandwidths B1 and B2 such that there is a broadening or flattening of the response. That is, the filter element 96 may have a different frequency 7 Mhz. than the filters 94 and 95 to adjust the amplitude responses of the channel in which filter system 50B resides.

Referring next to FIG. 8, another filter system 50C is illustrated. This filter system has an input at line 49 and an output at line 51. An inductance 100 is connected between input and output while LC circuits 101 and 102 are connected at the ends of inductance 100 to a reference potential. A switch 103 selectively connects the resistor 104 across inductance 100 for detuning or broadening the band of the filter system 50C. Also, capacitor 105 can be switched into the circuit across inductance 100 by switch 106. Switch 107 selectively connects resistor 108 across the LC circuit 101 for adjusting its responsiveness. Series resistors 109 are selectively connected to LC circuit 102 by switch 110. Each of the resistors 109 has a different resistance value for adjusting the Q of the LC circuit 102 and thereby adjusting the shape of the response of the filter system 50C. From viewing FIGS. 7 and 8, it is seen that any type or form of adjusting the operation of a filter may be employed to accomplish the purposes of the present invention. Such filter systems may be of the intermediate frequency amplifier type; that is, the gain-controlled amplifiers 46 may be combined with the filter systems 50 as an IF strip.

The output signal on line 17 is supplied to utilization means 67 which may be a PPI or other form of visual indication of the detected radar return. As the detection varies, it may be desired to adjust the spectrum shaping and adjustment circuit 11 to improve signal detection as described above. This can be done on a manual basis through a control unit 124 (FIG. 4). Manual intervention is indicated by a dashed line 120 extending from utilization means 67 to control 124. Control 124 may consist of potentiometers, selection switches and the like. Cable 123 connects control unit 124 to the circuit 11. Cable 130 which forms a part of cable 123 is connected to power divider network 44 and has M signal paths therein as seen in FIG. 6. Cable 130 is divided into a plurality of signal paths 84 and connected to the various power dividing units 71, 74, 75 and 80. The utilization of an electrical control signal to power-dividing units is well known and will not be further described for that reason. Cable 48 also forms a part of cable 123 and is connected to the various gain-controlled amplifiers 46. It also has M signal paths, one for each of the processing channels 12. The operation of a gain-controlled amplifier through the use of electrical signal means is well known and will not be further described for that reason. In order to adjust the amplitude of the various processing channels, one with respect to the other, power divider network 44 and gain-controlled amplifiers 46 may be simultaneously or individually adjusted depending upon the adjustment situation. In addition to adjusting the amplitude of the signals being processed through the various channels 12, the amplitude within the channels, i.e., may be made to vary with the frequencies and the bandwidth may be changed. The adjustment of the power divider network 44 and the gain-controlled amplifiers 46 would usually adjust the gain uniformly across the various channels. Cable 131 having M signal paths leaves cable 123 and is connected to the various filter systems 50 to electrically alter the filter frequency responsiveness, bandwidth and the like as explained above to alter the frequency characteristics of the various processing channels. Each filter 50 may have one or more input control connections, for example, filter 50A (FIG. 7) would have one control input for controlling the switches 92 and 93 simultaneously, while filter 50B has two input connections for independently controlling the switches 97 and 98 as above described. Adjustment of these filters is described later. Therefore, cable 131 is shown as having M+ signal paths indicating that a minimum of M signal paths with no maximum in accordance with the adjustability of the various filter systems 50. Line 126 is also taken out of cable 123 and is connected to oscillator 61 which provides a heterodyning signal for mixer 60. The signal on line 126 adjusts the frequency translation of not only mixer 60 but a mixer 42 through the responsiveness of phase-lock loop 43 to the oscillator 61 signal supplied over line 125. This action has the effect to the filter 50 frequencies and thereby adjusts the responsiveness of the circuit 11 across the single-sided bandwidth.

Range tracker 121 is provided to ensure that the boxcar detectors 64 accurately detect the input signal from the video signal on line 62. Range trackers are well known; however, range tracker 121 may be the tracker described in the copending patent application Kern Ser. No. 602,977 filed Dec. 19, 1966, and assigned to the assignee of this application. The video on line 62 corresponds to the video on line 24 of the Kern application. The output of the range tracker to control VCO 122 of the present application corresponds to the line 106 controlling the VCO 107 of the above-mentioned Kern application. The gate generator 108 of the Kern application corresponds to the gate generator 16 of the present application. The operating frequency of VCO 122 is varied in accordance with the control signal of range tracker 121 such that the boxcar detectors 64 are actuated when the input signal should occur within the range gate as is well known in the trade. VCO 122 supplies its signal to pulse former 140. Pulse former 140 generates a pulse having a duration and shape corresponding with the input signal waveshape. Since the present application describes a plural-pulse input signal (no limitation thereto intended), delay lines 141, 142 are provided to supply a plurality of successively occurring gating signals through cable 63. In the illustrated embodiment there are M number of delay units 141, 142 to provide M successively occurring range gating signals through the M signal path cable 63 to the respective boxcar detectors 64. There are of course M boxcar detectors 64.

While a manual control unit 124 is shown as controlling the operation of the spectrum shaping and adjustment circuit 11, as well as the frequency of oscillator 61, it is understood that control 124 may be constructed to provide automatic or semiautomatic control. To so do, a mathematical representation of the desired input signal should be provided in a calculating or signal comparison device, such as a digital or analog computer. The signal on line 17, the range tracker signals, and possibly the output signals of boxcar detectors 64 are all processed with respect to the mathematical representation to determine the effectiveness of the spectrum shaping and adjustment circuit 11 in rejecting the interference and accentuating or maximizing the amplitude of the input signal. Once such processing has been completed, the various operating adjustments are calculated, control signals generated and supplied over cables 130, 48, 131 and line 126 to provide the indicated adjustments.

The operation of phase-lock loop 43 is keeping the heterodyning signal supplied to mixer 42 is well known and understood. It is shown that the oscillator 61 provides a signal over line 125 to phase-lock loop 43 such that the heterodyning signal has a constant frequency relationship to the oscillator 61 frequency to ensure that the video signal on line 62 is not frequency translated. In the alternative, phase-lock loop 43 may be arranged to adjust the frequency of oscillator 61 such that the master frequency control resides in phase-lock loop 43. In such an instance, line 126 would be supplied to the phase-lock loop 43 oscillator (not shown) to simultaneously adjust the operating frequency of the phase-lock loop 43 and oscillator 61.

It is also understood that the illustrated embodiment is described as a part of a radar set. It is to be understood that angle-tracking circuits, range measurement circuits, velocity-tracking loops and the like would appear in any radar set incorporating the teachings of the present invention. The extraneous controls and other circuit configurations of a radar set were not shown to simplify the presentation of the signal processing circuit and to point up the invention. While it is shown that the spectrum shaping and adjustment circuit 11 serves as intermediate frequency amplifier section of the radar receiver, no limitation thereto is intended. It is advantageous to use the intermediate frequency because the size of the components in the circuit 11 may be reduced and the handling of the signals is facilitated. It is understood that the spectrum shaping and adjustment circuit 11 may be inserted in the video section of the radar processor such as being inserted between mixer 60 and time correlation circuit 15. It is also possible to use the spectrum shaping and adjustment circuit 11 in the RF section 41. It is also to be understood that the invention may be utilized as shown in FIG. 1 in any signal processing circuit, and no limitation to radar signal processing is intended.

We claim:

1. A signal-processing circuit for improving the ratio of power of an input signal to the power of interfering signals and having a given processing frequency bandwidth,
 the improvement including in combination,
 input means for receiving an incoming signal having an input signal in a spectrum of interfering signals,
 spectrum adjustment circuit means for adjusting the amplitudes of predetermined frequency portions of the incoming signal in inverse relation to the expected interference spectrum power levels in the respective frequency portions, said spectrum adjustment circuit means including means for selecting said predetermined frequency portions of said incoming signal for providing a plurality of processing channels, one channel for each said frequency portion, amplitude adjustment means in each of said processing channels for adjusting the amplitude of incoming signals being processed through that channel in inverse proportion to the expected interfering signal amplitudes in that channel and including means for altering said amplitude adjustment;
 electrical summer means receiving signals from all said processing channels for recombining same into a composite spectrum adjusted signal,
 and output means for detecting said input signal from said composite spectrum adjusted signal.

2. The circuit of claim 1 wherein each said amplitude adjustment means comprise a gain-controlled amplifier with the gain of the respective amplifiers being different one with respect to each other in accordance with an inverse ratio of the expected clutter power level of the incoming signal in the respective processing channels.

3. The circuit of claim 1 wherein said amplitude adjustment means includes a power-dividing network receiving said incoming signal and having a plurality of power-dividing means for dividing said incoming power among said processing channels in a predetermined manner and gain-controlled amplifier means in each of the channels each having a gain in accordance with the relationship of said expected clutter power level divided by the power supplied to the respective channels by said power-dividing network.

4. The circuit of claim 1 further including means in said frequency selection means for adjusting the frequency responsiveness of said frequency selection means for the respective processing channels.

5. The circuit of claim 4 wherein said frequency selection means includes a filter for each processing channel with each said filter being adjustable to permit selective alteration of its passband of frequencies.

6. The circuit of claim 5 for detecting an input signal with plural pulse components wherein said frequency selection means further includes means for translating the frequencies of said processing frequency bandwidth for adjusting all the frequency portions with respect to all processing channels.

7. The circuit of claim 1 wherein said output means includes time correlation means for receiving said spectrum adjusted signal, said time correlation circuit means including phase generating means supplying plural successively occurring phase signals in accordance with the plural pulse components of said input signal, and a plurality of boxcar detectors successively actuated by said phase generating means, each said boxcar detector receiving said spectrum adjusted signal and one phase signal and supplying a detected signal, summer means receiving said detected signals and adding the same together to supply an output signal of a predetermined amplitude.

8. The circuit of claim 7, in which said means for selecting said predetermined frequency portions includes filters and said amplitude adjustment means includes a power dividing network and gain controlled amplifiers, and further including spectrum adjustment control means, circuit means coupling said control means to said spectrum adjustment circuit for adjusting the operation of said power dividing network, said gain-controlled amplifiers, and said filters for altering the amplitude of said output signal by changing the responsiveness of said spectrum adjustment circuit to said incoming signal.

9. The circuit of claim 7 wherein said input means further includes RF signal means, mixer means and oscillator means for translating said RF signal to an intermediate frequency signal, said intermediate frequency signal being said incoming signal to said spectrum adjustment circuit means, frequency conversion means having an oscillator operating at said intermediate frequency for receiving said spectrum adjusted signal at said intermediate frequency and connecting same to a video signal and being electrically interposed between the first mentioned summer and said time correlation circuit means, and means for adjusting frequency of oscillation of both said oscillators to thereby adjust the intermediate frequency signal and alter the adjustment of the spectrum of said spectrum adjustment circuit means by frequency translating said incoming signals to a different intermediate frequency.

10. A signal processing circuit having a given processor bandwidth, including the combination, means for receiving a radio frequency signal having input signal, said input signal having a given plurality of pulse components, and interfering signal components, mixer means for translating the frequency of said incoming signal to an intermediate frequency signal, spectrum adjustment circuit means having plural processing channels for receiving said intermediate frequency signal and including power dividing means and gain-controlled amplifier means connected together to provide predetermined power levels in each said processing channels, frequency selection means in each said processing channel for selecting a predetermined bandwidth of frequencies within the processor bandwidth, each channel amplifying the incoming signals by an amount in inverse proportion to the power level of the interfering signal component, means for summing the signals supplied by each of the channels into a composite spectrum adjusted signal, second mixer means receiving the spectrum adjusted signal for converting same to a video signal, time correlation circuit means receiving said video signal and having plural pulse generator means for generating a given plurality of phase signals, a given plurality of boxcar detector means receiving said video signal and said phase signals, respectively, for time correlating said video with a predetermined pulse sequence and summer means in said time correlation circuit means for recombining the time correlated signals into an output signal, utilization means receiving said output signal, and control means connected to said spectrum adjustment circuit and said oscillators for adjusting the operation thereof for obtaining a maximum amplitude output signal.

11. A method of processing an incoming signal including first measuring the noise and clutter interfering signal levels in which an input signal to be detected resides, amplitude adjusting the incoming signal in inverse relation to the amplitude of the interfering signals and time correlating the input signal with a reference signal to provide an output signal of maximum amplitude.

12. The method of claim 11 wherein said amplitude adjustment is by frequency segments with the amplitude adjustments of all frequencies in each segment being substantially the same.

* * * * *